Patented Oct. 8, 1935

2,016,493

UNITED STATES PATENT OFFICE 2,016,493

COMPOSITE BEARING

Paul C. Haas, Mendon, Mich.

No Drawing. Application April 14, 1934,
Serial No. 720,569

6 Claims. (Cl. 308—242)

The present invention relates to an improved bearing suitable for industrial uses on heavy machinery and particularly as a roll-neck bearing.

The present invention is a direct improvement upon the composite bearing described and claimed in my Patent No. 1,946,790, granted February 13, 1934.

One of the objects of the invention is to produce a bearing which requires only water lubrication and which even under heavy loads will present a minimum of frictional resistance to the motion of the part or parts supported thereby.

A further object of the invention is to provide a bearing consisting of a fabric or fibrous base that has been cemented together and hardened by means of a cellulose ester composition which at no time is infusible, the purpose being to allow a small portion of this cellulose ester binder to be removed from the bearing surface by the friction of the supporting part, whereby the individual fibers are exposed and, under the influence of the water lubrication, imbibe water and thereby become slippery and unctuous, thereby greatly assisting in reducing the friction.

Another object of the invention is to provide a bearing, the bearing surface of which consists of cellulosic fibers held together by means of a cellulose ester composition having a fairly high softening point so constituted that it will release a small portion of the fibers so that they may freely imbibe water and thereby form an unctuous slippery surface for the bearing.

Large bearings, particularly for heavy machinery parts such, for example, as roll-neck bearings in rolling-mills, present a particularly difficult problem, especially regarding lubrication. In such cases, it is necessary to apply cooling-water to the bearings because of the heat ordinarily transmitted from the rolls themselves to the bearings, and such cooling-water usually interrupts the regular lubrication of metallic bearings. For this reason, efforts have been made in the past to provide non-metallic bearings such, for example, as wooden bearings which are dried and impregnated with oil or with oil suspensions of graphite and the like. Such bearings, however, are very short-lived and rapidly become deformed so that their replacement becomes necessary. This, of course, interrupts the operation of the mill and therefore is a great inconvenience.

A number of efforts have been made in the past to provide non-metallic bearings made of various synthetic resins, particularly of the phenol formaldehyde type, these usually being cut from laminated canvas stock. Such bearings, however, are extremely hard and brittle, and are very prone to break under unusual shock or stress to which the rolls may be subjected during use. Furthermore, being laminated, there is a decided tendency for delamination during use, which of course renders the bearings of no further utility and necessitates replacement.

Blocks of wood impregnated with resins have also been used but suffer from the defect that they are readily torn and their surfaces become pitted. They are also somewhat resilient and therefore will sag, thus interfering with the accurate setting of the rolls.

As already hereinabove stated, bearings consisting of canvas or duck impregnated with synthetic resins capable of induration, such for example as the phenolic condensation products, have already been described and employed for certain purposes such as non-lubricated bushings for automobile spring hangers or the like. For the present purpose, however, such hardened products are not suitable, as they have too high a coefficient of friction, even when copiously lubricated with water, and furthermore are not self-healing as are the bearings made in accordance with the present invention.

The bearing, as made in accordance with the present invention, preferably consists of a webbing which in its best exemplification consists of cotton which has been impregnated with a cellulose ester compound. The bearing is to be distinguished from a laminated bearing made of a number of layers of fabric which have been cemented together by means of a resin or other binder, in that the bearing is a unitary structure that consists of two or more relatively thickly woven portions which, however, are much thicker than the ordinary canvas laminations in a laminated plate or tube. In its finished condition, when ready for assembly with the usual metallic supporting block, such as shown in my Patent No. 1,946,790, the bearing material will contain anywhere from 73% of cellulose, such as cotton, and about 27% of a cellulose ester composition, to 45% cellulose and 55% of the cellulose ester. In any event, enough of the cellulose compound should be used to render the material sufficiently pressure-resistant for the purpose.

The method of making the bearing material is substantially as follows:

A suitable webbing, of the kind in which the fibers run in all three cubical directions, is impregnated with a solution of a cellulose ester composition. The cellulose ester composition is preferably cellulose acetate in conjunction with a suitable plasticizer therefor. It is, however, within the scope of the present invention to use other cellulose compounds such as cellulose aceto butyrate or aceto propionate, benzyl cellulose, ethyl cellulose, or even nitro cellulose, although the latter, because of its inflammability, is not as desirable as are the other cellulose esters.

A suitable composition for impregnating the webbing may consist, for example, of (1) 100 parts by weight of cellulose acetate,
10 to 40 parts by weight of a suitable plasticizer, and
300 to 500 parts of a suitable solvent.

The solvent may consist of methyl acetate, methyl acetone, acetone, methylene chloride or ethyl acetate, while the plasticizers may consist of diethyl phthalate, diethylene glycol acetate and triacetin. A large number of cellulose ester solvents are described in Worden's Technology of Cellulose Esters, Vol. VIII, 1916, pages 2662 to 2755, and in the same publication, Vol. I, part 4, 1920, pages 3022 to 3041. It is to be understood that any combination of a cellulose ester or cellulose ether, with its appropriate solvents and plasticizers, is to be construed as being within the scope of the present invention.

As a further exemplification of suitable compositions which may be employed for the impregnation of the webbing, I may mention the following:

*Example 2—Cellulose acetate*

|  | Parts |
|---|---|
| Commercial hydrolyzed acetate | 100 |
| Diethyl phthalate | 13 |
| Paratoluenesulfonamid | 26 |
| Solvents: acetone alcohol mixture | |

*Example 3—Cellulose aceto butyrate or aceto propionate*

|  | Parts |
|---|---|
| Hydrolyzed aceto butyrate | 100 |
| Diethyl phthalate | 30–40 |
| Solvents: acetone or ethylene dichloride | |

*Example 4—Benzyl cellulose*

|  | Parts |
|---|---|
| Benzyl cellulose | 100 |
| Triphenyl phosphate | 5–10 |
| (Many other plasticizers may be used) | |
| Solvent: Toluene 80 | |
| Alcohol 20 | |

*Example 5—Ethyl cellulose*

|  | Parts |
|---|---|
| Ethyl cellulose | 100 |
| Diethyl phthalate | 8 |
| Triphenyl phosphate | 4 |
| Camphor | 10 |
| Solvent: Toluol 50 | |
| Alcohol 50 and others. | |

Any of the above formulas, or modifications thereof, may be employed.

In order to facilitate the introduction of the cellulose compound into the webbing, it is also possible further to dilute any of the compositions above described by means of further quantities of the solvent. In any event, canvas, webbing or macerated canvas is impregnated with the solution of the cellulose compound, whereupon the solvent is allowed to evaporate. The solvent may be recovered by suitable means known in this art, but this forms no part of the present invention. Alternatively, canvas may be impregnated with the material and then cut up or chopped up after drying. The fragments thus obtained may then subsequently be molded in a suitable die or press to form a molded object of the size and shape of the desired bearing.

The molding operation is conducted substantially in the same manner as that described in my Patent No. 1,946,790, of February 13, 1934. For example, the webbing, thoroughly impregnated with the cellulose compound and freed from the volatile solvents, may be molded between two curved blocks or in a suitably constructed die, all in accordance with well known molding technique, at a temperature of about 150° to 160° C., under a pressure of about 1000 pounds per square inch, the pressure being exerted only long enough to give the bearing the desired shape, whereupon the mold or curved blocks are immediately cooled so as to set the compound and cause the molded parts to retain the shape given them by this operation.

The structure thus resulting may then, if necessary, be trimmed to shape, although when made in properly shaped molds it will be sufficiently accurate for immediate assembly with the mold-supporting blocks.

When placed into use, the first effect is the removal of the skin of cellulose compound on the molded part because of its frictional engagement with the periphery of the shaft or neck of the roller. This will immediately expose a very large number of cellulosic fibers, which, because of the fact that water is continually being pumped around and through the bearing, will absorb this water and swell, and will thereby form a very minute but effective cushion having a low coefficient of friction, so that the rolls may be rotated with a minimum consumption of applied power.

The particular advantage of the present bearing lies in the fact that if for any reason the supply of water should become too low or the temperature too high, the only effect will be a removal of a little of the cellulose compound and a consequent exposure of more of the fibers. This is a result which has not hitherto been attained in this art and therefore sharply differentiates the present invention from any previous molded bearings made from phenolic resins or the like, as these—being infusible and insoluble—will not permit of the exposure of the cellulosic portions of the webbing and therefore are not endowed with the valuable properties that inhere in the bearings as herein described.

It is within the contemplation of the present invention to furnish impregnated webbing to those who desire to manufacture bearings therefrom in their own plants, as the molding equipment required is extremely simple and the molding may be accomplished either in a screw-press or hydraulic press or in a comparatively simple jig which may readily be assembled by a skilled workman in a rolling-mill or other plant where these bearings are to be employed.

The bearing may be made from a piece of impregnated webbing by laying the same upon a suitable mold-supporting block which has been heated, whereupon a piece of shafting corresponding in size to the neck of the roll that is to be supported by the bearing, and which has likewise been heated, is placed thereon, and the assembly is then placed into pressure applying means such as a hydraulic press until the cellulose compound softens and the webbing assumes the shape of the radial supporting member, whereupon the assembled material may be cooled by the simple expedient of dashing water thereon or playing water upon it with a hose. It is thus seen that it is not necessary to employ special molding equipment and that therefore the bearing may be made in outlying sections of the world where molding plants are not available.

Their extreme simplicity is a particular advantage inherent in bearings made of webbing impregnated with cellulose compounds. It therefore could not have been predicted or foreseen that particular advantages would reside in the choice of the binder, whereas, in fact, as hereinabove set forth, these advantages are very marked and produce a highly desirable article.

Other organic esters or ethers having the qualities of cellulose compounds, in so far as their plasticity is concerned, may be substituted for the cellulose compounds.

As a modification, the impregnating fluid, consisting of dissolved cellulose compounds, may also have incorporated therewith a small amount of oil-dispersible graphite, which will further increase the lubricating value of the bearing, but for most purposes such addition of graphite is unnecessary.

Cellulose compounds such as the cellulose esters and ethers have properties which enable them to be substituted for a fusible and non-hardenable resin such as described in my Patent No. 1,946,790. Experiments which I have made show that not only are these cellulose compounds capable of being used as hereinabove described, but they have many advantages over the cumarone resin described in my above mentioned patent. One of the particular advantages of the cellulose compounds is the fact that their softening point can be very accurately controlled by adjustment of the ratio between the cellulose compound and the plasticizers. Furthermore, the cellulose compounds, in the presence of the plasticizers, are much tougher and less brittle than are the resins described in my patent. Another advantage is the fact that these cellulose compounds are substantially entirely insoluble in oils, while some of the resins employed in accordance with the teachings of my patent are affected by oil. A further advantage residing in the use of the cellulose compounds lies in the fact that the bearing materials made therefrom may be shipped to distant points without danger of premature adhesion to each other; and furthermore it is possible to produce built-up bearings by laminating together a number of layers of impregnated fabric, because the cellulose compounds, particularly in the presence of the plasticizers employed, have a much greater tendency to bond themselves together and thus to form a unitary bearing than do the resins described in my patent.

In the hereunto subjoined claims I wish it to be understood that by the term "cellulose compound" I mean to include not only the ethers and esters of cellulose as such but also those of hydrocellulose and oxycellulose, and those of such analogous carbohydrates as starch.

What it is desired to protect by Letters Patent is the following:

1. A bearing material for use with water lubrication, comprising a mass of cellulosic webbing embedded in a minor portion of a placticized compound from the group consisting of cellulose esters and ethers, whereby, under the influence of friction and the action of applied water, a portion of the webbing will be exposed and become wet, thereby forming an unctuous distended cellulosic bearing-surface.

2. A bearing material comprising a body of cellulosic webbing impregnated with a heat-softenable compound from the group consisting of cellulose esters and ethers, and a bearing surface of cellulosic fibers the ends of which are embedded in said cellulosic compound.

3. A bearing material consisting of woven cellulosic webbing impregnated with a cellulose ester and a plasticizer therefor.

4. A bearing material consisting of woven cellulosic webbing impregnated with a cellulose ether and a plasticizer therefor.

5. A bearing material comprising a body of cellulosic webbing impregnated with a thermoplastic compound of a cellulose ester of an aliphatic acid and a plasticizer therefor.

6. A bearing material consisting of a woven webbing stiffened by means of a plasticized cellulose compound selected from the group consisting of cellulose acetate, cellulose aceto butyrate, cellulose aceto propionate, benzyl cellulose, ethyl cellulose and cellulose nitrate, and a plasticizer from the group consisting of diethyl phthalate, diethylene glycol acetate, triacetin, paratoluenesulfonamid, triphenyl phosphate and camphor.

PAUL C. HAAS.